(12) United States Patent
Hall

(10) Patent No.: US 7,472,464 B2
(45) Date of Patent: Jan. 6, 2009

(54) MILLING HEAD FOR REMOVING HEAT DISSIPATING ELEMENTS FROM A TUBE

(75) Inventor: J. Randall Hall, Wadsworth, OH (US)

(73) Assignee: H&S Tool, Inc., Wadsworth, OH (US)

( * ) Notice: Subject to any disclaimer, the term of this patent is extended or adjusted under 35 U.S.C. 154(b) by 541 days.

(21) Appl. No.: 11/266,103

(22) Filed: Nov. 3, 2005

(65) Prior Publication Data

US 2007/0098509 A1    May 3, 2007

(51) Int. Cl.
*B23P 23/00* (2006.01)
(52) U.S. Cl. .................. 29/33 T; 29/890.031; 29/50; 82/113; 409/138; 409/192; 407/48; 407/42
(58) Field of Classification Search .................. 29/33 T, 29/33 D, 50, 890.31, 566, 566.1; 82/113, 82/128; 409/138, 232, 234, 178–179, 192, 409/203, 213, 217; 408/80, 82, 79, 201, 408/204, 207, 209, 703, 223–225, 206; 30/93–99; 407/33, 34, 40, 42, 47–48
See application file for complete search history.

(56) References Cited

U.S. PATENT DOCUMENTS

| | | |
|---|---|---|
| 1,204,994 A | 11/1916 | Kendall |
| 1,253,015 A | 1/1918 | Driscoll |
| 3,051,059 A | 8/1962 | Davey |
| 3,054,313 A | 9/1962 | Stikeleather |
| 3,157,076 A | 11/1964 | Arthur |
| 3,228,268 A | 1/1966 | Strout |
| 3,976,388 A | 8/1976 | Webb |
| 3,999,452 A * | 12/1976 | Larsen .................. 82/113 |
| 4,051,586 A | 10/1977 | Hicks |
| 4,091,699 A | 5/1978 | Chaze et al. |
| 4,192,067 A | 3/1980 | Calhoun et al. |
| 4,364,290 A | 12/1982 | Astle |
| 4,437,366 A | 3/1984 | Astle |
| 4,449,871 A | 5/1984 | Hillestad |
| 4,459,883 A | 7/1984 | Astle |
| 4,486,131 A | 12/1984 | Eckle |
| 4,498,820 A | 2/1985 | Brennan |
| 4,601,222 A | 7/1986 | Gill |

(Continued)

FOREIGN PATENT DOCUMENTS

GB    2092934 A    10/1982

OTHER PUBLICATIONS

Babcock/Deutsche Babcock Catalog Pages, publication date purportedly Jan. 1992, 5 pages purportedly from Catalog.

*Primary Examiner*—Erica E Cadugan
(74) *Attorney, Agent, or Firm*—Hudak, Shunk & Farine Co. LPA

(57) ABSTRACT

A milling head for a milling device, particularly a rotary milling device, wherein the milling head is capable of imparting a desired finish on a tube, preferably of a heat exchanger tube. The milling head includes one or more milling elements capable of cutting and/or removing heat dissipating elements connected to an outer surface of the tube. The heat dissipating elements are removed from the tube in a longitudinal direction along the tube length. In one embodiment, the milling head also includes a bevel milling element. Methods for milling a tube having heat dissipating elements are also described.

33 Claims, 3 Drawing Sheets

U.S. PATENT DOCUMENTS

| | | |
|---|---|---|
| 4,633,555 A | 1/1987 | Legge |
| 4,689,920 A | 9/1987 | Geise |
| 4,691,600 A | 9/1987 | Carlson et al. |
| 4,718,201 A | 1/1988 | Legge |
| 4,739,688 A | 4/1988 | Brennan et al. |
| 4,743,149 A | 5/1988 | Geise |
| 4,747,886 A | 5/1988 | Dankovic et al. |
| 4,830,551 A | 5/1989 | Brennan et al. |
| 4,872,249 A | 10/1989 | VanderPol et al. |
| 4,889,454 A | 12/1989 | Hillestad et al. |
| 4,979,294 A | 12/1990 | Bowman et al. |
| 5,033,347 A | 7/1991 | Hillestad et al. |
| 5,044,075 A | 9/1991 | Brennan et al. |
| 5,160,549 A | 11/1992 | Murphy |
| 5,211,212 A | 5/1993 | Carlson et al. |
| 5,304,018 A | 4/1994 | LaVanchy et al. |
| 5,314,270 A | 5/1994 | Lavancy et al. |
| 5,356,248 A | 10/1994 | Hillestad |
| 5,531,550 A | 7/1996 | Moruzzi |
| 5,542,177 A | 8/1996 | Hillestad |
| 5,741,097 A * | 4/1998 | Murphy, II .................. 409/180 |
| 5,911,548 A | 6/1999 | Deiss et al. |
| 6,276,244 B1 | 8/2001 | Fisher et al. |
| 6,786,684 B1 | 9/2004 | Ecker |
| 6,955,507 B2 | 10/2005 | Hall |
| 7,305,746 B2 * | 12/2007 | Moruzzi ........................ 29/50 |
| 7,313,992 B2 * | 1/2008 | Hall .............................. 82/46 |
| 7,360,975 B2 * | 4/2008 | Hall ........................... 409/138 |
| 2004/0234349 A1 | 11/2004 | Ueda et al. |
| 2005/0053440 A1 | 3/2005 | Hall |
| 2007/0110531 A1* | 5/2007 | Hall ........................... 409/131 |

* cited by examiner

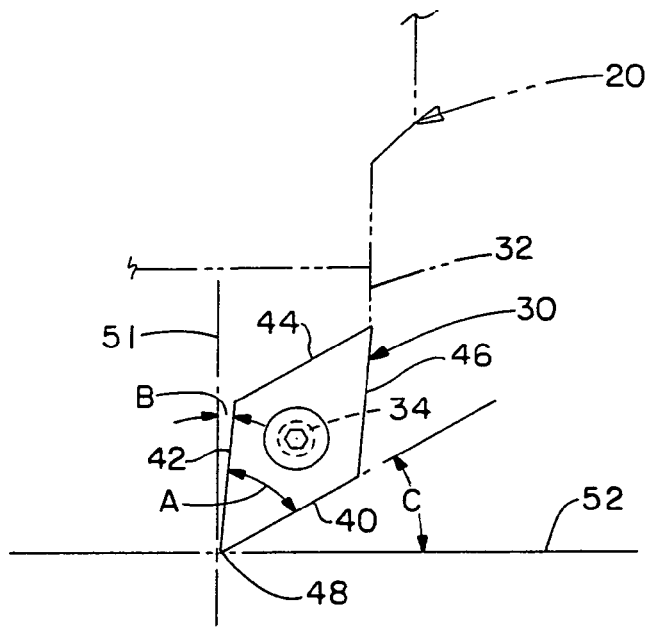
FIG.-4
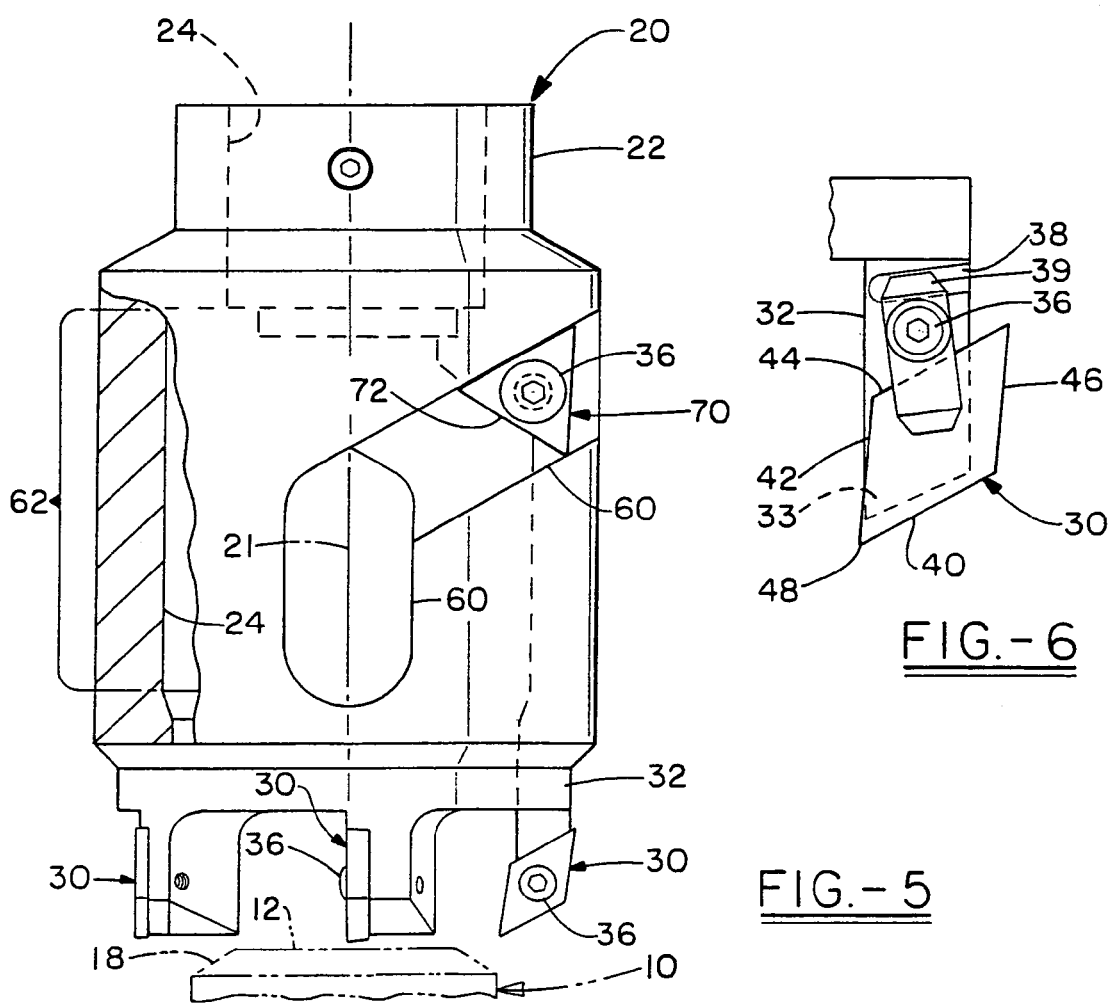
FIG.-6
FIG.-5

MILLING HEAD FOR REMOVING HEAT DISSIPATING ELEMENTS FROM A TUBE

FIELD OF THE INVENTION

The present invention relates to a milling head for a milling device, particularly a rotary milling device, wherein the milling head is capable of imparting a desired finish on a tube, preferably of a heat exchanger tube. The milling head includes one or more milling elements capable of cutting and/or removing heat dissipating projections or elements connected to an outer cylindrical surface of the tube. The heat dissipating elements are removed from the tube in a longitudinal direction along the tube length. In one embodiment, the milling head also includes a bevel milling element. Methods for milling a tube having heat dissipating elements are also described.

BACKGROUND OF THE INVENTION

Power generating or other plants circulate fluids, such as water or steam, through tubes or banks of tubes. The fluid is often heated and used, for example, to drive turbines which generate electricity. On account of deterioration due to corrosion and the like, tubes occasionally require replacement. The tubes to be repaired or replaced are generally cut out in a predetermined area utilizing a power saw or cutting torch. For example, see U.S. Pat. No. 5,033,347, herein fully incorporated by reference.

Such tubes requiring replacement or repair can be heat exchanger tubes comprising a tube having heat dissipating elements arranged on an outer surface of the tube. The heat dissipating elements are arranged in any pattern and are typically welded or adhered to the tube, or the like. The heat dissipating elements aid in transferring heat between the tube and the ambient atmosphere. Such heat exchanger tubes are well known in the art, see U.S. Pat. No. 4,051,586 to Hicks for example.

In order to repair heat exchanger tubes, the end of the tube must be prepared and often it is desirable to remove any heat dissipating elements within an area a predetermined distance from the tube end. Various devices and methods for removing heat dissipating elements have been proposed in the prior art.

U.S. Pat. No. 4,747,886 relates to a robot drive for cutting fins having pipes extending on opposite sides therefrom, with the pipes laying in parallel spaced apart rows, comprising a carriage which can move in the longitudinal direction between rows of the pipes. A pair of drive guide rollers is mounted to the carriage for rolling against the pipe of one of the rows. The carriage also carries four spring loaded pressure wheels which bear against the fins of the pipe in an adjacent row so as to press the carriage and guide rollers against the pipe on which the guide rollers roll. A pair of cutting torches or mechanical cutters are connected to the carriage on opposite sides of the guide rollers so they can cut the fins of the pipes on which the guide rollers roll.

U.S. Pat. No. 5,160,549 relates to a tube fin trimming machine adapted for clamping and cutting elongated finned structures, such as finned tubes. The trimming machine includes an elongated main frame having at least one guideway, support means attached to the base plate and adapted for supporting the finned structure of a carriage unit longitudinally movable relative to the main frame and guideway, and at least one cutting torch unit movably mounted on the carriage unit. Each cutting torch is mounted above an elongated fin and is moved both longitudinally and laterally relative to the fin, so as to provide a desired elongated tapered shape for the fin.

The invention also relates to a method for operation of the fin trimming machine to perform desired trimming operations on elongated finned structures, such as finned tubes.

In order to prepare heat exchanger tubes for further use, it would be beneficial to provide a rotary milling tool having a milling head capable of removing heat dissipating elements from the end of a tube. After selected heat dissipating elements are removed, the tube can be further processed and joined with a second tube as known in the art.

SUMMARY OF THE INVENTION

The present invention provides devices and methods for performing milling or cutting operations on a tube including one or more heat dissipating projections or elements, preferably located on an outer cylindrical surface of a tube, i.e. the outer diameter. In one embodiment, a milling head for a rotary milling tool is provided having milling elements adapted to remove heat dissipating elements present on the outer surface of a tube.

The milling head preferably also includes a bevel milling element adapted to impart a beveled edge or finish on an end of the tube. The bevel milling element is located a predetermined distance from heat dissipating element milling element.

Accordingly, it is an object of the present invention to provide a milling head having milling elements adapted to remove heat dissipating milling elements from an outer surface of a tube. In one embodiment, it is further adapted to additionally place a bevel on a tube end.

A further object of the present invention is to provide a milling head and methods for preparing an end portion of a tube for a subsequent welding operation.

In a further embodiment, a milling head is provided that allows for precision milling of the tube end and is capable of performing multiple operations simultaneously to enable a user to efficiently complete tube preparation.

Accordingly, one embodiment of the present invention relates to a milling head for a rotary milling tool, comprising a body having a tool mounting portion adapted to be connected to a rotary milling tool, wherein the body has a tube bore adapted to accept a portion of a tube, and one or more milling elements adapted to mill a heat dissipating element on the tube, wherein the one or more milling elements are connected to a milling element support of the body, wherein the milling element has a first cutting edge and a second cutting edge meeting at a tip, and wherein an angle between the first cutting edge and the second cutting edge is less than 60°, and wherein an angle between the first cutting edge and a line extending through the tip perpendicular to a central rotational axis of the milling head is from about 15° to about 75°.

A further embodiment of the present invention relates to a milling head for a rotary milling tool, comprising a body having a tool mounting portion adapted to be connected to a rotary milling tool, wherein the body has a tube bore adapted to accept an end portion of a tube, and one or more projection milling elements adapted to mill a heat dissipating projection on the tube, wherein the one or more projection milling elements are connected to a milling element support of the body, wherein the milling element has a first cutting edge and a second cutting edge meeting at a tip, and wherein an angle between (i) a first line extending from the tip to a point on the first cutting edge, and (ii) a second line extending from the tip to a point on the second cutting edge is from about 25° to about 59°, and wherein an angle between the first line and a third line measured through the tip perpendicular to a central rotational axis of the milling head is from about 15° to about 75°.

Yet another embodiment of the present invention relates to a method for milling a tube having heat dissipating elements, comprising the steps of providing a milling head comprising a body having a tool mounting portion adapted to be connected to a rotary milling tool, wherein the body has a tube bore adapted to accept a portion of a tube, and one or more milling elements adapted to mill a heat dissipating element on the tube, wherein the one or more milling elements are connected to a milling element support of the body, wherein the milling element has a first cutting edge and a second cutting edge meeting at a tip, and wherein an angle between (i) a first line extending from the tip to a point on the first cutting edge, and (ii) a second line extending from the tip to a point on the second cutting edge is from about 25° to about 59°, and wherein an angle between the first line and a third line measured through the tip perpendicular to a central rotational axis of the milling head is from about 15° to about 75°; connecting the milling head to a rotary milling tool; and milling heat dissipating elements on an outer surface of the tube with the milling head.

These and other features, advantages and objects of the present invention will be further understood and appreciated by those skilled in the art by reference to the following specification, claims and appended drawings.

BRIEF DESCRIPTION OF THE DRAWINGS

The invention will be better understood and other features and advantages will become apparent by reading the detailed description of the invention, taken together with the drawings, wherein:

FIG. 4 is a schematic of one embodiment of a milling element of the present invention connected to a milling element support, illustrating angular relationship between the milling element surfaces and an axis parallel to the central rotational axis as well as an axis perpendicular to the central rotational axis.

FIG. 5 is a side elevational view of one embodiment of a milling head of the present invention having a plurality of heat dissipating milling elements as well as a bevel milling element.

FIG. 6 is a partial side elevational view of one alternative embodiment for securing a milling element to the milling element support of the milling head.

DETAILED DESCRIPTION OF THE INVENTION

Figure 1:
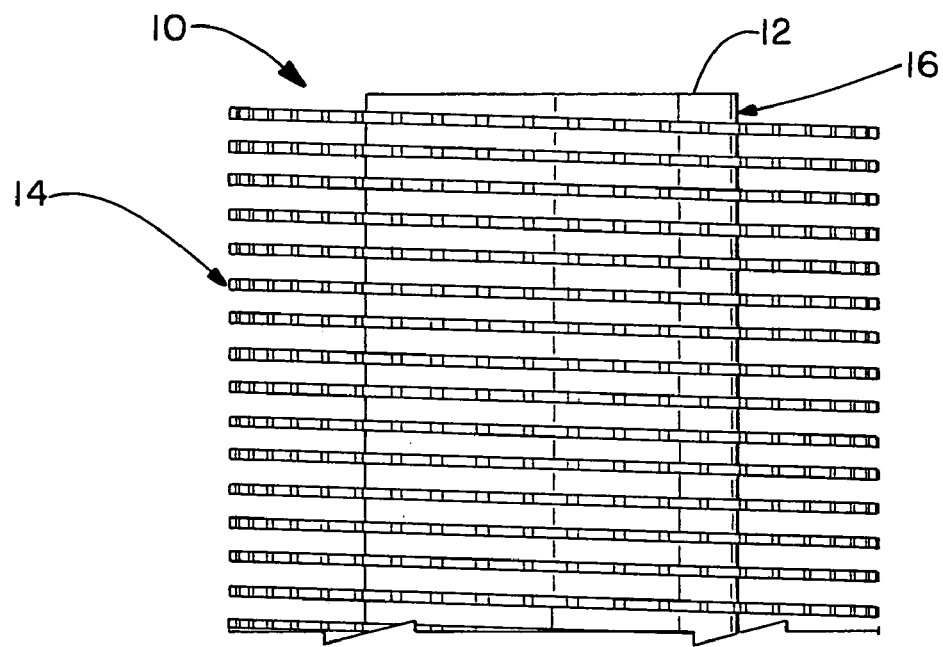
FIG. 1 is a front elevational view of a tube having a plurality of heat dissipating elements.
Figure 3:
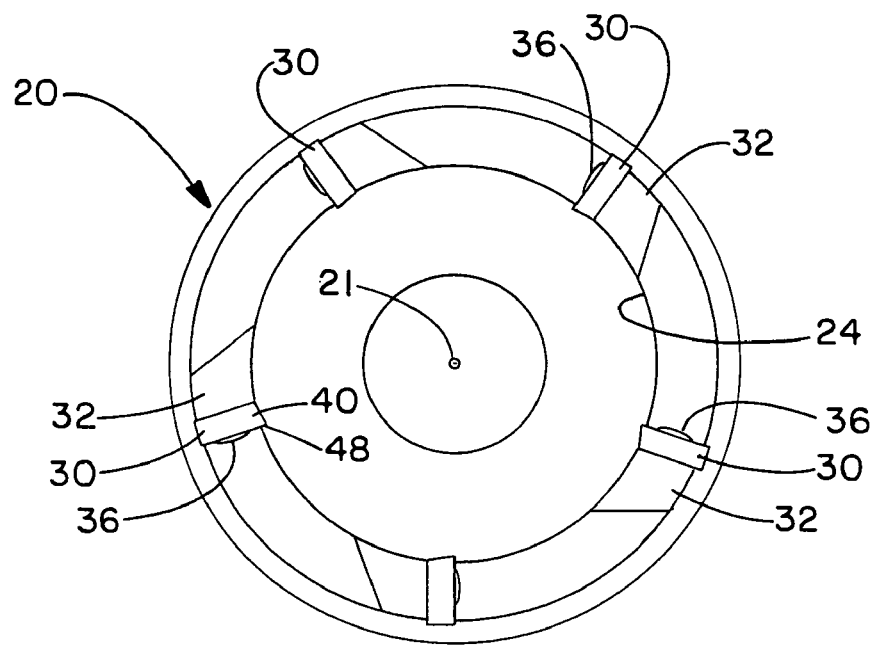
FIG. 3 is a bottom view of one embodiment of a milling head of the present invention.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to FIG. 1, wherein a heat exchanger tube 10 is illustrated. The heat exchanger tube 10 comprises a pipe or tube having one or more, and preferably a plurality of, heat dissipating projections or elements 14 connected to the outer cylindrical surface of the tube 10. The tube 10 and heat dissipating elements 14 are each generally formed of a metal or metal alloy, and the tube 10 can be of the same or different composition as each heat dissipating element 14. Suitable metals or alloys include, but are not limited to, steel, iron, copper, aluminum, and stainless steel.

The heat dissipating elements 14 can be connected to the tube 10 in any suitable manner as known in the art. For example, the heat dissipating elements 14 can be welded to the tube 10, adhered to the tube 10 by an adhesive, or swaged to the tube 10, or the like. Heat dissipating elements 14 can be arranged in any suitable manner on the outer surface of the tube. Helically finned heat exchanger tubes are shown in U.S. Pat. No. 4,051,586. In other embodiments, heat dissipating elements 14 can be projections, fins, studs, cylinders, dimples, or the like. Adjacent heat dissipating elements 14 can be connected if desired. Heat dissipating elements 14 can extend outward, generally radially outward, from the outer diameter of the tube 10 in any direction and can vary individually in shape as well as length, if desired. In the embodiment shown in FIG. 1, the heat dissipating elements 14 are generally raised teeth extending helically around the outer circumference of the tube 10. The shape of the heat dissipating elements 14 is not critical, but serves to transfer heat from the tube to the surrounding ambient atmosphere or vice versa. The heat dissipating elements 14 are typically flexible, at least at the end opposite a first end connected to the tube 10.

A milling head 20 of the present invention is attached to a rotary milling device or power tool as known in the art. Rotary milling devices are well known in the art and are commercially available from sources such as H&S Tool of Wadsworth, Ohio. Examples of rotary milling tools include, but are not limited to, Model MB, Model MS, Model B, Model MT, and Model MFT. Rotary milling devices are generally electrically or pneumatically powered.

Figure 2:
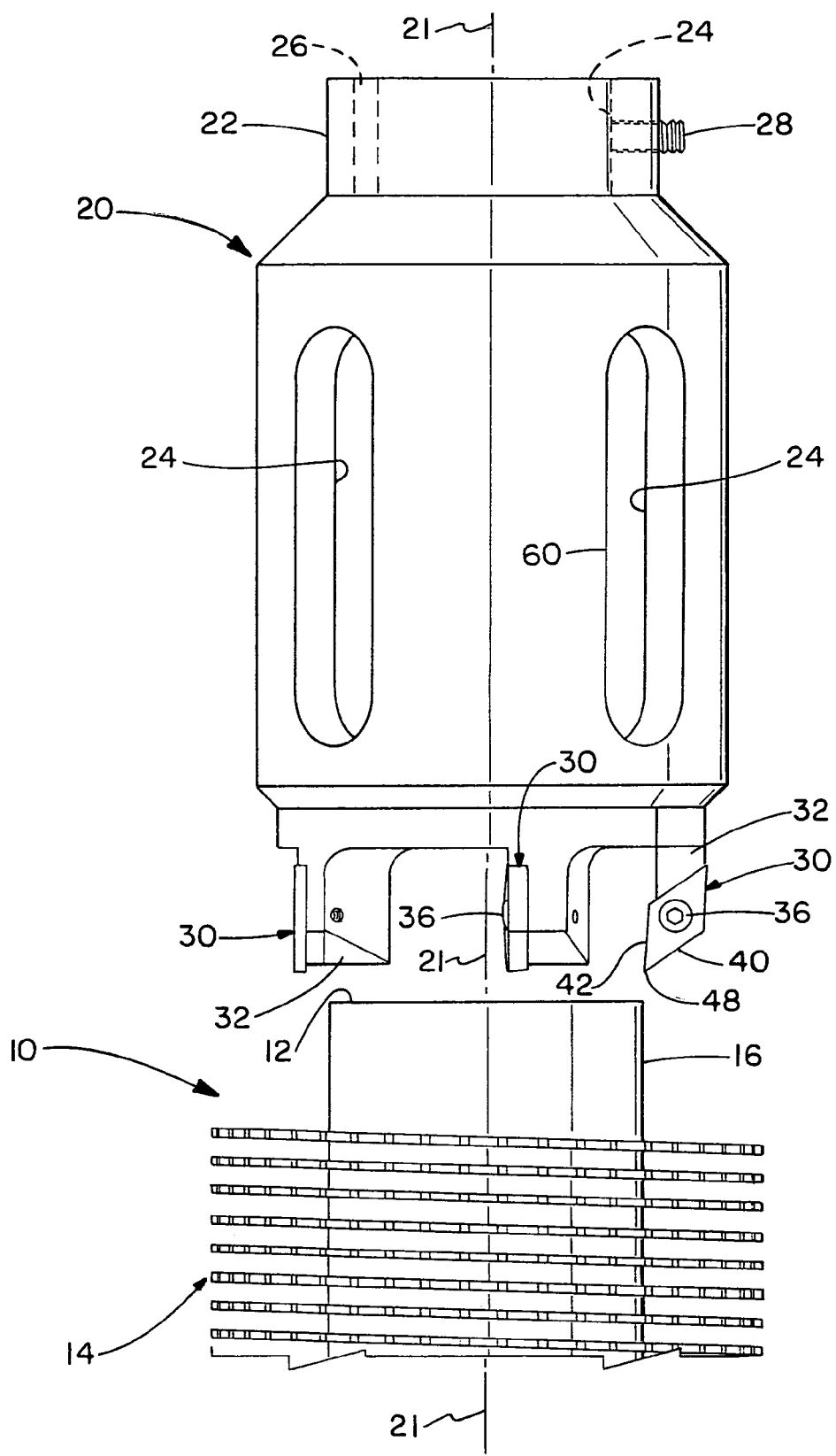
FIG. 2 is a side elevational view of one embodiment of a milling head located above a tube having a plurality of heat dissipating elements, wherein a portion of the heat dissipating elements have been removed from the tube end with the milling head.

In one embodiment, as shown in FIG. 2, a milling head 20 of the present invention is configured to mill heat dissipating elements 14 connected to the outer diameter of a tube 10, preferably without removing any material from the outer surface of the tube 10 itself. However, although currently not preferred, it may be desirable or preferred in some embodiments to use the milling head 20 to remove a portion of the tube material from the outer surface of the tube 10 along with any heat dissipating elements 14 present on the surface of the tube 10 in an area where the milling operation is performed.

Milling head 20, as illustrated in FIG. 2, includes a tool mounting portion 22, generally located at the upper end of milling head 20. Tool mounting portion 22 preferably includes a bore 24 which can be operatively connected to rotary gearing of a rotary milling tool as known in the art. Bore 24 further allows for passage of a rod, a collet, or other rotary tool securing mechanism, as known in the art that can be utilized to operatively secure the rotary milling tool and thus rotary milling head 20 in relation to tube 10 to the heat dissipating elements 14 thereon. In one embodiment, bore 24 includes a key slot 26 which is adapted to matingly engage a key on the rotary milling tool to lock the milling head 20 to the rotary tool gearing. Set screw 28 is optionally utilized to maintain engagement of the rotary milling tool with milling head 20. Various other means for mounting milling heads to rotary tools are known in the art and can alternately or concurrently be utilized.

One or more milling elements 30 adapted to mill heat dissipating elements 14 are connected to a milling element support 32 of milling head 30. The number of milling elements 30 present on milling head 20 ranges generally from about 1 to about 10, desirably from about 2 to about 8, and preferably from about 4 to about 6. Milling element 30 is adapted to remove any heat dissipating elements 14 present on the surface of tube 10 by cutting, grinding, shaving, abrading, or the like. In a preferred embodiment, milling head 30 is utilized to substantially remove any heat dissipating elements 14 present on the surface of tube 10 in a predetermined or desired area near end 12. Some portion of the heat dissipating elements 14, such as a stub, base, or the like, may remain on the outer surface of the tube 10 after a milling operation has been performed. As shown in FIG. 2, any heat dissipating elements 14 not milled with milling head 20 will remain on tube 10, and tube 10 transitions between a milled area substantially free of heat dissipating elements 14 and a non-milled area containing heat dissipating elements 14.

In order to produce a desired milling action, the milling elements 30 present on milling head 20 are arranged in a preferred configuration in relation to a central longitudinal rotational axis 21 of milling head 20. In a preferred embodiment, milling element 30 is removably connected to milling head 20 by a securing element 36 such as a screw, bolt, or the like, that extends through a bore 34 of milling element 30 and is secured in a bore, preferably threaded, of milling element support 32. In one embodiment, bore 34 can be elongated so the milling elements 30 can be adjusted in relation to milling element support 32 and be secured at a user desired position.

In one embodiment, milling element 30 includes a face surface having a countersink or recess around bore 34 through which securing element 36 connects milling element 30 to milling head 20. In a preferred embodiment, securing element 36 is a low profile securing element, such as described in U.S. Pat. No. 6,955,507 herein fully incorporated by reference. That is, a head of the securing element, or an end portion, or the like, extends a minimal distance out from the face of the milling element in a secured position, and can be flushed mounted or recessed mounted in the countersink of bore 34.

In a further optional embodiment, the milling element 30 is secured to milling element support 32, such as shown in FIG. 6, with a fixing element 39 that is connected to milling element support 32 with a securing element. In this embodiment, milling element 30 is connected between fixing element 39 and a back 33 of milling element support 32. The fixing element 39 can be provided with a foot or projection that mates with a recess 38 in milling element support 32 to securely lock milling element 30 in a predetermined position to milling element support 32. Back 33 is generally a wall that extends in a plane radial to central axis 31 or another angle in relation thereto.

Milling element 30 is provided with one or more cutting edges 40, 42, 44 and 46 as shown in FIG. 4, that can be active or inactive generally not participating in the milling operation and used as aligning surfaces that position milling element 30 in a desired position. Each cutting edge 40, 42, 44 and 46 has a first end and a second end. The surface of each cutting edge 40, 42, 44 and 46 between the first end and the second end is preferably linear. In a preferred embodiment, cutting edges 40, 42, 44 and 46 lie in a plane substantially radial to central rotational axis 21. As shown in FIGS. 2 and 4, first cutting edge 40 is active and cutting edges 42, 44 and 46 are generally inactive. First or lower cutting edge 40 in the position shown in the drawings performs a majority and preferably all of the milling of the heat dissipating elements 14 due to the configuration of milling head 20.

In a preferred embodiment, the position of milling element 30 on milling head 20 is defined in terms of location or angle of the one or more cutting edges 40, 42, 44 and 46 in relation to a longitudinal line 51 parallel to the central axis and a line 52 perpendicular to the central axis of milling head 20, preferably radial to central axis 21. A point or cutting tip 48 is present where first cutting edge 40 meets second cutting edge 42, as shown in FIG. 4. Cutting tip 48 is considered a (0,0) coordinate point for an xy coordinate system, wherein the x-axis is line 52 that extends perpendicular to central axis 21, and wherein the y-axis is longitudinal line 51 parallel to central axis 21, with both lines extending through tip 48.

As illustrated in FIG. 4, Angle "A" is the internal angle between first cutting edge 40 and second cutting edge 42 measured from cutting tip 48. Angle "A" is defined as the angle between (i) a first line extending between cutting tip 48, a first point, and a second point on cutting edge 42, or any point on cutting edge 42 when cutting edge 42 is linear or straight, and (ii) a second line between cutting tip 48, the first point, and a second point on cutting edge 40, or again any point on cutting edge 40 when cutting edge 40 is linear or straight. Angle "A" ranges generally from about 25° to about 59° or to less than 60°, desirably from about 30° to about 57°, and preferably from about 35° to about 55° or about 56°.

As further illustrated in FIG. 4, angle "B" is defined as the angle between (i) a line extending between cutting tip 48, the first point, and a second point on cutting edge 42, or any point on cutting edge 42 when cutting edge 42 is linear or straight, and (ii) line 51 parallel to central longitudinal axis 21 of milling head 20 that includes the point of cutting tip 48. Angle "B" ranges generally from 0° to about 15°, desirably from about 2° to about 10°, and preferably from about 4° to about 8°. In a preferred embodiment, angle "B" is about 5°.

As also illustrated in FIG. 4, angle "C" is defined as the angle between (i) a line extending between cutting tip 48, the first point, and a second point on cutting edge 40, or any point on cutting edge 40 when cutting edge 40 is linear or straight, and (ii) line 52 perpendicular to central axis 21 of milling head 20 that includes the point of cutting tip 48. Angle "C" ranges generally from about 15° to about 75°, desirably from about 20° to about 60°, and preferably from about 25° to about 35°. In a particularly preferred embodiment, angle "C" is about 30°.

As illustrated in FIG. 4, the sum of angles "A", "B" and "C" is equal to 90°, namely the angle between longitudinal line 51 extending parallel to central axis 21 and line 52 extending perpendicular to central axis 21. As stated above, Angle "A" is the internal angle between cutting edges 40 and 42. Angle "B" when greater than 0°, insures that the upper portion of cutting edge 42 is located a further distance away from the outer diameter of tube 10 so that a free cutting action is obtained, thereby substantially preventing any stuttering or seizing of milling head 20. The requirements for angle "C" insure that cutting tip 48 contacts heat dissipating elements 14 in an area close to where the heat dissipating elements 14 are connected to tube 10. Angles less than given for Angle "C" above tend to "push" the heat dissipating elements 14 leading to an inefficient milling process.

In yet a further embodiment of the present invention, milling head 20 is provided with one or more open windows 60 that allows viewing of the workpiece or tube within the milling head bore 24. As illustrated in FIG. 2, viewing window 60 allows a user to assess the milling operation while in progress. As milling head 20 rotates around center of axis, viewing window 60 functions as a window that allows the user to view structures within the milling head 20 due to the configuration thereof. Viewing window 60 extends a longitudinal direction substantially parallel to central rotational axis 21 generally from about 50% to about 90%, desirably from about 50% to about 85%, and preferably from about 60% to about 80% of the length of tube bore 24 of milling head 20. Tube bore 24 extends from the lower end of milling head 20, generally cutting tip 48 to tool mounting portion 22. Tube bore 24 generally has a length measured parallel to central rotational axis 21, generally from about 1 inch (2.54 cm) to about 6 inches (15.24 cm), desirably from about 1 inch (2.54 cm) to about 4 inches (10.16 cm), and preferably from about 3 inches (7.62 cm) to about 4 inches (10.16 cm). The one or more windows 60 present on milling head 20 extend laterally around the circumference of the outer diameter milling head 20 in an amount generally from about 10% or more, desirably 15% or more, and preferably about 18% or more based upon the total circumferential distance of the outer diameter of milling head 20 around central axis 21. Window 60 can generally be any size so long as structural integrity of the milling head 20 is maintained. Window 60 also allows cutting chips, shavings, or the like to escape and also reduces the weight of milling head 20.

In yet a further embodiment of the present invention, milling head 20 is provided with an internal relief 62 in bore 24 that is an area of increased internal diameter within milling head 20. Internal relief 62 has a greater radius measured from central rotational axis 21 when compared to the radial distance from central rotational axis 21 to milling element support 32 as illustrated in FIG. 5. Internal relief 62 has a length parallel to central rotational axis 21 of from about 1 inch (2.54 cm) to about 4 inches (10.16 cm), desirably from about 1 inch (2.54 cm) to about 3 inches (7.62 cm), and preferably from about 2 inches (5.08 cm) to about 3 inches (7.62 cm). The difference in radius between internal relief 62 and inner diameter of milling support 32 to central rotational axis 21 is generally greater than 5%, desirably greater than 10%, and preferably greater than 20%. Providing an internal relief 62 having a radius greater than the radius of the inner diameter of milling element support 32 substantially prevents the inner diameter of milling head, i.e. tube bore 24, from rubbing with a tube outer diameter such as when tube 10 flexes during the milling operation.

In a further embodiment of the present invention, milling head 20 is provided with a bevel milling element 70 that is adapted to place a frustoconical bevel on the end 12 of tube 10. Beveled edge 18 is illustrated on tube 10 in FIG. 5. Bevel milling element 70 is connected to milling head 20 in an area generally between tool mounting portion 22 and heat dissipating milling elements 30. As illustrated in FIG. 5, bevel milling element 70 is connected to a portion or wall of window 60, preferably utilizing a securing element 36, such as a screw, bolt, or the like. Bevel milling element 70 preferably includes a bore through which a portion of securing element 36 can be inserted and secured to a bore on milling head 20. Any number of bevel milling elements 70 can be attached to milling head 20, with two bevel milling elements 70 being preferred to neutralize opposing forces. The number of bevel milling elements 70 is generally determined by the size of the milling head, wherein larger diameter milling heads can accommodate a greater number of bevel milling elements 70. As illustrated in FIG. 5, bevel milling element 70 takes up a relatively small volume or space of window 60. Advantageously, during use, shavings, chips, flakes, or the like generated by the milling operation can exit milling head 20 through window 60. At least one bevel milling element 70 is connected to milling head 20 in one embodiment so that bevel cutting edge 72 extends inwardly into annular tube bore 24 as shown in FIG. 5. Bevel cutting edge 72 is preferably arranged along a radial plane extending from the central axis 21 of milling head 20. Bevel cutting edge 72 of bevel milling element 70 is arranged in a predetermined angle in relation to milling head 20 central rotational axis 21 in order to provide a tube end with a desired bevel angle. Bevel cutting edge 72 is fixed at an angle of about 20° to about 60°, desirably about 30° to about 45°, and preferably about 37.5° in relation to central rotational axis 21 of milling head 20. At least a portion of bevel milling element 70 cutting edge 72 is positioned at least radially equal to and inwardly of milling element 30 radial inner edge, generally cutting tip 48 in a preferred embodiment. Bevel milling element 70 has an annular cutting sweep that is at least concentric with an inner end of a cutting sweep of the milling element 30 and radially inward a distance from the heat dissipating milling element 30 cutting sweep.

Bevel milling element 70 is securely connected to a wall of window 60 that is preferably vertically oriented and parallel to the longitudinal central rotational axis 21 of milling head 20. In a preferred embodiment, the wall face is a plane radial to central rotational axis 21 of milling head 20. As shown in FIG. 5, bevel milling element 70 is substantially triangular and includes three cutting edges. It is to be understood that the bevel milling element 70 can have other shapes, such as a diamond or other shape, and is not limited to only the triangular embodiment illustrated. As shown in FIG. 5, only one cutting edge is utilized to bevel a tube end, while the remaining cutting edges are unused or inactive. One of the inactive cutting edges abuts an upper wall of window 60 and braces the bevel milling element 70 against the body of milling head 20, substantially preventing movement of bevel milling element 70 during the milling operation.

As with milling element 30, bevel milling element 70 can have a neutral, positive or negative rake, with a positive rake being preferred. Advantageously, once active bevel cutting edge 72 becomes worn or the like, bevel milling element 70 can be removed, rotated, and reconnected, thereby providing a sharp cutting edge. Likewise, heat dissipating milling element 30 can be removed, rotated and reconnected such that cutting edge 44 becomes an active cutting edge. Each heat dissipating element milling element 30 and bevel milling element 70 can be utilized multiple times before needing replaced or resharpened. In one embodiment, bevel milling element 70 has a countersunk orifice for attachment of the securing element 36.

Bevel milling element 70 and thus bevel cutting edge 72 is spaced a predetermined distance from the lowermost point of milling element 30 in order to prepare a tube having desired characteristics. The lowermost portion of bevel cutting edge 72 is located a distance from the lowermost active cutting edge 40 of milling element 30 generally from about 1 inch (2.54 cm) to about 5 inches (12.70 cm), desirably from about 2 inches (5.08 cm) to about 4 inches (10.16 cm), and preferably from about 2 inches (5.08 cm) to about 3 inches (7.62 cm).

In a further embodiment, milling element 30 or bevel milling element 70, or a combination thereof, having a cutting edge that is a chip breaker cutting edge that produces an even, smooth finish on a tube surface. The chip breaker cutting edge has a tapered cutting edge similar to a typical knife blade. The tapered edge progresses from a relatively thicker portion of the blade and ends in a relatively thin, sharp point which provides a clean finish to the tube end to be beveled. The chip breaker can be made by grinding, removing, or building up a portion of a blade surface in the area of the cutting edge to form the tapered edge.

The milling heads of the present invention are preferably formed utilizing a CNC machining system. Milling head 20 is preferably formed from a suitable metal such as medium carbon alloy steel, high carbon alloy steel, stainless steel, or similar metals or alloys of metals. Milling head 20 is preferably formed out of a metal or metal alloy suitable to withstand a heat treating process which generally imparts a hard finish and durability to the milling head. The heat dissipating milling elements 30 can be formed out of a metal or metal alloy such as tool steel or carbide, with carbide being preferred, as carbide provides long cutting edge life and desirable wear characteristics. Bevel milling element 70 of the present invention can be formed of the same materials as the heat dissipating milling elements 30, but is desirably formed of carbide.

One method for utilizing the milling head of the present invention follows. Milling head 20 is attached through tool mounting portion 22 to a rotary milling tool. The rotary milling tool is preferably temporarily releasably connected or secured to the tube utilizing a collet or other device as known in the art. Milling head 20 is advanced towards the tube, wherein milling element(s) 30 contact heat dissipating elements 14 of tube 10 and subsequently mill the same. Milling head 20 is advanced along the tube as the milling operation is performed. Any heat dissipating elements 14 present on the surface of the tube are removed within the cutting sweep of milling elements 30. As the milling head is advanced along the tube, the bevel milling element 70, if present, contacts tube end 12 and mills a desired bevel onto tube 10. After the desired milling operation has been performed, the rotary milling tool is disconnected from the tube.

In accordance with the patent statutes, the best mode and preferred embodiment have been set forth; the scope of the invention is not limited thereto, but rather by the scope of the attached claims.

What is claimed is:

1. A milling head for a rotary milling tool and having a central rotational axis, comprising:
   a body having an upper tool mounting portion adapted to be connected to a rotary milling tool, wherein the body has a tube bore adapted to accept a portion of a tube, and one or more milling elements adapted to mill a heat dissipating element on the tube, wherein the one or more milling elements are each connected to a respective milling element support of the body, wherein the one or more milling elements each have a lowermost first cutting edge and a second cutting edge meeting at a tip located at a lowermost, radially innermost portion of the respective milling element, and wherein an angle between the first cutting edge and the second cutting edge is less than 60°, and wherein an angle between the first cutting edge and a line extending through the tip perpendicular to the central rotational axis of the milling head is from about 15° to about 75°.

2. The milling head according to claim 1, wherein the one or more milling elements each have a bore, and wherein a respective securing element has a portion that extends through the respective milling element bore and connects the respective milling element to the respective milling element support.

3. The milling head according to claim 1, wherein a portion of the one or more milling elements is connected between a surface of the respective milling element support and a respective fixing element, and wherein the respective fixing element is connected to the respective milling element support by a respective securing element.

4. The milling head according to claim 1, wherein a bevel milling element adapted to mill a bevel on an end of the tube is connected to the body between the tool mounting portion and the one or more heat dissipating milling elements.

5. The milling head according to claim 4, wherein the bevel milling element includes a bevel cutting edge that is fixed at an angle of about 20° to about 60° in relation to the central rotational axis.

6. The milling head according to claim 5, wherein the bevel cutting edge is fixed at an angle of about 30° to about 45° in relation to the central rotational axis.

7. The milling head according to claim 1, wherein 1 to about 10 of the milling elements are connected to the respective milling element support of the body.

8. The milling head according to claim 7, wherein an angle between the second cutting edge and a line extending through the tip parallel to the central rotational axis is from 0° to about 15°.

9. The milling head according to claim 8, wherein the angle between the first cutting edge and the second cutting edge is from about 25° to about 59°.

10. The milling head according to claim 9, wherein the angle between the first cutting edge and the line extending through the tip perpendicular to the central rotational axis of the milling head is from about 20° to about 60°.

11. The milling head according to claim 10, wherein the angle between the first cutting edge and the second cutting edge is from about 35° to about 57°.

12. The milling head according to claim 11, wherein about 4 to about 6 of the milling elements are present on the milling head.

13. The milling head according to claim 11, wherein a bevel milling element adapted to mill a bevel on an end of the tube is connected to the body.

14. The milling head according to claim 1, wherein the angle between the first cutting edge and the second cutting edge is from about 35° to about 57°, wherein the angle between the first cutting edge and the line extending through the tip perpendicular to the central rotational axis of the milling head is from about 25° to about 35°, and wherein an angle between the second cutting edge and a line extending through the tip parallel to the central rotational axis is from about 4° to about 8°.

15. The milling head according to claim 1, wherein the body includes a window between an inner and outer diameter of the milling head extending in a longitudinal direction of the milling head substantially parallel to the central rotational axis from about 50% to about 90% of the length of the tube bore of the milling head.

16. The milling head according to claim 15, wherein the body window extends in a longitudinal direction substantially parallel to the central rotational axis from about 60% to about 80% of the length of the tube bore of the milling head.

17. The milling head according to claim 1, wherein the tube bore includes an internal relief that has a radius measured from the central rotational axis greater than the radial distance from the central rotational axis to an innermost surface of the milling element support or supports.

18. A milling head for a rotary milling tool and having a central rotational axis, comprising:
a body-having an upper tool mounting portion adapted to be connected to a rotary milling tool, wherein the body has a tube bore adapted to accept an end portion of a tube, and one or more projection milling elements adapted to mill a heat dissipating projection on the tube, wherein the one or more projection milling elements are each connected to a respective milling element support of the body, wherein the one or more milling elements each have a lowermost first cutting edge and a second cutting edge meeting at a tip located at a lowermost, radially innermost portion of the respective milling element, and wherein an angle between (i) a first line extending from the tip to a point on the first cutting edge, and (ii) a second line extending from the tip to a point on the second cutting edge is from about 25° to about 59°, and wherein an angle between the first line and a third line measured through the tip perpendicular to the central rotational axis of the milling head is from about 15° to about 75°.

19. The milling head according to claim 18, wherein the one or more projection milling elements each have a bore, and wherein a respective securing element has a portion that extends through the respective projection milling element bore and connects the respective projection milling element to the respective milling element support.

20. The milling head according to claim 18, wherein a portion of the one or more projection milling elements is connected between a surface of the respective milling element support and a respective fixing element, and wherein the respective fixing element is connected to the respective milling element support by a respective securing element.

21. The milling head according to claim 18, wherein a bevel milling element adapted to mill a bevel on an end of the tube is connected to the body between the tool mounting portion and the one or more projection milling elements.

22. The milling head according to claim 21, wherein the bevel milling element includes a bevel cutting edge that is fixed at an angle of about 20° to about 60° in relation to the central rotational axis.

23. The milling head according to claim 22, wherein the bevel cutting edge is fixed at an angle of about 30° to about 45° in relation to the central rotational axis.

24. The milling head according to claim 18, wherein 1 to about 10 of the milling elements are connected to the respective milling element support of the body.

25. The milling head according to claim 24, wherein an angle between the second line extending from the tip and the point on the second cutting edge and a line extending through the tip parallel to the central rotational axis is from 0° to about 15°.

26. The milling head according to claim 25, wherein the angle between the first line extending from the tip and the point on the first cutting edge and the second line extending from the tip and the point on the second cutting edge is from about 30° to about 57°.

27. The milling head according to claim 26, wherein the angle between the first line extending from the tip and the point on the first cutting edge and the line through the tip perpendicular to the central rotational axis of the milling head is from about 20° to about 60°.

28. The milling head according to claim 27, wherein the angle between the first line extending from the tip and the point on the first cutting edge and the second line extending from the tip and the point on the second cutting edge is from about 35° to about 56°.

29. The milling head according to claim 28, wherein about 4 to about 6 of the milling elements are present on the milling head.

30. The milling head according to claim 28, wherein a bevel milling element adapted to mill a bevel on an end of the tube is connected to the body.

31. The milling head according to claim 18, wherein the body includes a window between an inner and outer diameter of the milling head extending in a longitudinal direction of the milling head substantially parallel to the central rotational axis from about 50% to about 90% of the length of the tube bore of the milling head.

32. The milling head according to claim 31, wherein the body window extends in a longitudinal direction substantially parallel to the central rotational axis from about 60% to about 80% of the length of the tube bore of the milling head.

33. The milling head according to claim 18, wherein the tube bore includes an internal relief that has a radius measured from the central rotational axis greater than the radial distance from the central rotational axis to an innermost surface of the milling element support or supports.

* * * * *